United States Patent [19]

Uram, Jr.

[11] 4,412,052

[45] * Oct. 25, 1983

[54] MOISTURE PERMEATION RESISTANT RESINS FROM EPOXY RESINS, POLYMERCAPTANS, AND AMINOSILANES

[75] Inventor: John R. Uram, Jr., Glendale, Ariz.

[73] Assignee: Goodyear Aerospace Corporation, Akron, Ohio

[*] Notice: The portion of the term of this patent subsequent to Oct. 5, 1999, has been disclaimed.

[21] Appl. No.: 377,274

[22] Filed: May 12, 1982

Related U.S. Application Data

[60] Division of Ser. No. 204,424, Nov. 6, 1980, Pat. No. 4,352,848, which is a continuation-in-part of Ser. No. 70,390, Aug. 28, 1979, Pat. No. 4,294,886.

[51] Int. Cl.$^3$ .................. C08G 59/40; C08G 77/26
[52] U.S. Cl. ........................................ 528/27; 525/504
[58] Field of Search .......................... 528/27; 525/504

[56] References Cited

U.S. PATENT DOCUMENTS 3,247,280  4/1966  Kanner ........................... 528/27 X

FOREIGN PATENT DOCUMENTS

1745149  8/1971  Fed. Rep. of Germany ........ 528/27
47-43200 10/1972  Japan ..................................... 528/27

*Primary Examiner*—Earl A. Nielsen
*Attorney, Agent, or Firm*—L. A. Germain; P. E. Milliken; D. J. Hudak

[57] ABSTRACT

A high heat resistant transparency of epoxy resins cured with adducts of trimethoxyboroxine and benzyl alcohol is disclosed to resist intense heat for these transparencies in their use on military and industrial hardware. This transparency may exist in a composite with other layers of transparent material known to those skilled in the art. The epoxy transparency layer is bound to the other transparent layers, in a variety of configurations, using an interlayer of mercaptan terminated resins. These resins greatly improve resistance to moisture permeability in and about the edges of the entire transparency.

8 Claims, 14 Drawing Figures

Days of Exposure at 200°F /100% Relative Humidity

MOISTURE PERMEATION RESISTANT RESINS FROM EPOXY RESINS, POLYMERCAPTANS, AND AMINOSILANES

CROSS REFERENCE TO RELATED APPLICATION

This application is a divisional of my copending application bearing Ser. No. 204,424, filed Nov. 6, 1980, now U.S. Pat. No. 4,352,848 for "Transparencies Produced from Epoxy Resins Cured with Adducts of Trimethoxyboroxine and Benzyl Alcohol and Interlayers of Mercaptan Resins," which in turn is a continuation-in-part of application Ser. No. 070,390 filed on Aug. 28, 1979, now U.S. Pat. No. 4,294,886 which issued on Oct. 13, 1981.

BACKGROUND ART

Heretofore, the use of transparencies in military and industrial hardware has required exacting properties for their certified use. For example, a military helicopter having vast areas of transparent material will require special transparent material having identifiable indices of refraction to prevent internal reflection of sunlight. Other transparencies require resistance to penetration by projectiles. Still other transparencies are designed for resistance to abrasion.

The use of these transparencies in military and industrial applications has been severely limited by the temperatures these composite materials could withstand. Direct application of a heat source or a high energy point of origin could quickly alter the physical properties of the composite materials. Whether the thermal effects be generated by fossil fuel fires or laser application, the conventional transparencies lacked sufficient resistance to the intense heat generated. Therefore, the need exists for a material which is heat resistant, in order to complement the impact, ballistic, abrasion, or light resistant materials presently existing in composite transparencies.

Likewise, the use of these transparencies in military and industrial applications has been subjected to irreversible damage caused by the penetration of moisture into the various layers of the composite transparent structure. The susceptibility of these materials to moisture penetration in humid conditions creates a lasting haze within the transparency structure. Further, the materials must maintain adhesion among the various layers and also must maintain modulus values among the various layers at acceptable and constant levels. Therefore, the need exists for a material which is resistant to moisture permeability to protect conventional and heat resistant transparent materials from haze characteristics but further maintains ultimate strength and constant modulus.

DISCLOSURE OF INVENTION

Therefore, it is an object of the invention to provide a transparency produced from epoxy resins cured with adducts of trimethoxyboroxine and benzyl alcohol to provide an intense heat resistant material to be incorporated with composite transparencies for use in military and industrial applications.

It is another object of the invention to provide a transparency produced from epoxy resins, as above, wherein the intense heat resistant material has the same or similar index of refraction in order that it be used with other composite materials to complement their properties.

Moreover, it is an object of the invention to provide transparencies produced from epoxy resins, as above, wherein the intense heat resistant material may control the reactivity of the entire transparency against degradation of properties caused by intense general heat or a high energized point source.

It is yet another object of the invention to provide a process for the production of transparencies having epoxy resins cured with adducts of trimethoxyboroxine and benzyl alcohol to insure intense heat resistant properties in the entire transparency.

Still another object of the invention is to provide a transparency produced from epoxy resins cured with adducts of trimethoxyboroxine and benzyl alcohol and triphenyl phosphite to improve the intense heat resistant characteristics of the transparent composite.

Yet another object of the invention is to provide a transparency produced from epoxy resins cured with adducts of trimethoxyboroxine and benzyl alcohol and triphenyl phosphite which can be formed into curved articles.

Another object of the invention is to provide a transparency produced from epoxy resins resistant to moisture permeability by the application of an interlayer binding means within the transparency composite.

Yet another object of the invention is to provide a mercaptan resin interlayer resistant to moisture permeability to protect transparent materials from the effects of moisture haze.

Still another object of the invention is to provide a mercaptan resin interlayer resistant to moisture permeability which maintains ultimate strength and modulus.

Still another object of the invention is to provide mercaptan resin edge sealer resistant to moisture permeability to protect transparent materials from the effects of moisture haze.

These, and other objects which will become more apparent as the detailed description of the preferred embodiment proceeds, are achieved by: a transparent composition having resistance to intense heat, comprising: a transparent blend having from 80 parts to about 100 parts of an epoxy resin; from 5.0 parts to about 30 parts of trimethoxyboroxine; and from 1 part to about 10 parts of a phenyl substituted alkyl alcohol. The objects also are achieved by: a transparency composition having resistance to intense heat, comprising: a transparent blend having from 80 parts to about 100 parts of an epoxy resin; from 5.0 parts to about 30 parts of trimethoxyboroxine; from 1 part to about 10 parts of a phenyl substituted alkyl alcohol; and from 5 parts to about 25 parts of a phosphite selected from the group consisting of diphenyl phosphite, trisnonylphenyl phosphite, triphenyl phosphite, diphenylisodecyl phosphite, dephenylisooctyl phosphite and phenyldiisodecyl phosphite.

The object of the invention are also achieved by a blend having, (a) about 100 parts by weight of a mercaptan resin having the following formula:

where R is an aliphatic hydrocarbon having from 1 to 18 carbon atoms and where n is 1 or 2; (b) from about 40 to about 250 parts by weight of an epoxy resin; and (c)

from about 0.5 parts by weight to about 4.0 parts by weight of a silane selected from the group consisting of: N-aminoalkyl-aminoalkyl-trialkoxysilanes of the formula wherein $R_1$ is an alkylene having 1-6 carbon atoms and $R_2$ is an alkyl having 1-6 carbon atoms, and aminoalkyl-trialkoxysilanes of the formula wherein $R_1$ and $R_2$ are as defined above and combinations thereof.

The objects of the invention are also achieved by a composition resistant to moisture permeation, comprising: a transparent blend having a specific permeability of less than 1.00 mg·mm/24 hr cm$^2$; said blend comprising from about 100 parts by weight of a thio-terminated aliphatic hydrocarbon based resin; and from about 40 to about 250 parts by weight of an epoxy resin; and from about 0.5 parts by weight to about 4.0 parts by weight of a silane terminated compound.

DESCRIPTION OF THE DRAWINGS

For an understanding of the invention, reference is had to the following drawings, wherein.

BEST MODE FOR CARRYING OUT THE INVENTION

Transparencies that have been produced with epoxy resins desiring to achieve heat resistant properties have typically included a boroxine such as trimethoxyboroxine. Typical epoxy resins include, but are not limited to, bisphenol-A type, bisphenol-F type, and novolac type epoxy resins. Typical boroxines include boroxines having the formula where R is a compound having from 1 or 2 to 18 carbon atoms. Desirably, R, is an alkyl compound and has from 1 or 2 to 5 carbon atoms. Trimethoxyboroxine is preferred. Trimethoxyboroxine has exhibited, in combination with epoxy resin, a resistance to heat from a general or point source up to temperatures of 2000° F. However, a major complication is the low concentration of trimethoxyboroxine in the epoxy resin system. Previously, for large casting purposes, it was possible to use a concentration of trimethoxyboroxine of 5-7.5 parts per hundred parts of epoxy resin (PHR). Any greater concentration would deleteriously promote the reaction between the trimethoxyboroxine and epoxy resin, resulting in a short gel time making it extremely impractical to cast large panels.

Figure 4:
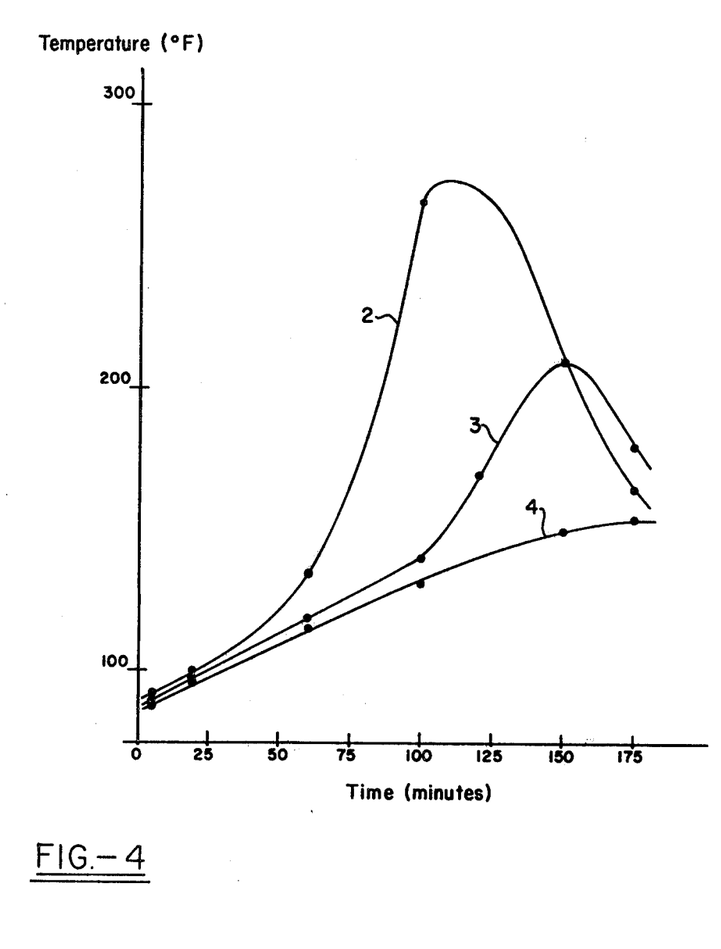
FIG. 4 is a graph showing the effect of alcohol levels on the maximum exotherm in the reaction system.

It has been found that higher concentrations of a boroxine such as trimethoxyboroxine can be incorporated into an epoxy resin system and still have sufficient time to cast large sheets if a phenyl substituted alkyl alcohol is added. The alkyl alcohol contains from 1 to 20 carbon atoms and desirably from 1 to 10 carbon atoms. Preferably, Benzyl alcohol is used. The alcohol acts as retarder and inhibitor for the trimethoxyboroxine epoxy reaction, permitting the usage of an increased concentration of the trimethoxyboroxine and a concomitant increase in heat resistant properties. This concentration may be readily increased to 30 parts of a boroxine such as trimethoxyboroxine per hundred parts of epoxy resin. Not only is the rate of reaction between the trimethoxyboroxine and epoxy resins inhibited, but the maximum exotherm is significantly reduced with the phenyl substituted alkyl alcohol addition, as shown in FIG. 4.

TABLE 1

THE EFFECT OF BENZYL ALCOHOL ON MAXIMUM EXOTHERM

|  | Curve | | |
| --- | --- | --- | --- |
|  | 2 | 3 | 4 |
| Trimethoxy Boroxine | 10 | 10 | 10 |
| Benzyl Alcohol | 2 | 3 | 4 |
| Dow DEN-431 | 85 | 85 | 85 |
| Neopentyl Glycol Diglycidyl Ether | 15 | 15 | 15 |
| Gel Time (Minutes) | 65 | 85 | No sharp gel time |
| Maximum Exotherm (°F.) | 270 | 215 | 155 |

While phenyl substituted alkyl alcohols permit increased concentration of the trimethoxyboroxine in the epoxy resin, benzyl alcohol is preferred. Benzyl alcohol is preferred because of its purity, as well as its index of refraction, its clear color, it high flask point, its relatively low solubility in water, its low vixcosity, and its high boiling point.

Both the epoxy resin capable of serving as the matrix for the instance heat resistant composite and the trimethoxyboroxine and their heat resistant properties are known to those skilled in the art of composite transparency production. However it is the inclusion of the phenyl substituted alkyl alcohol which enables one to increase the level of trimethoxyboroxine which results in an increase in intense heat resistance for the transparency not otherwise present. The phenyl substituted alkyl alcohol is present in a concentration of from about 20 parts to about 50 parts per one hundred parts of trimethoxyboroxine or from about 1 parts to about 10 parts per 100 parts of epoxy resin. Preferably, the concentration of benzyl alcohol is 33 parts to one hundred parts of trimethoxyboroxine, or 3.3 parts to one hundred parts of epoxy resin.

Figure 1:
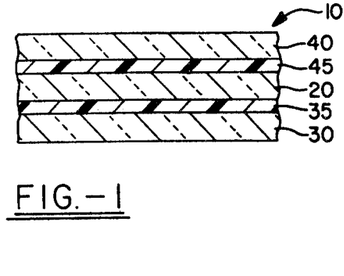
FIG. 1 is a cross sectional view of the transparency composite having the intense heat resistant interlayer.

Referring now to FIG. 1, it may be seen that the transparency composite, generally referred to as 10, is composed of three layers with the epoxy resin interply 20, a reaction product of an adduct of trimethoxyboroxine and benzyl alcohol with an epoxy resin placed between an inside ply 40 and an outside ply 30. The outside ply 30 may be composed of transparent materials well known to those skilled in the art and specifically providing impact, ballistic, abrasion, weather resistant and light reflectant resistant properties which resin interply 20 complements. Typically, this outside ply 30 may be composed of acrylic, polycarbonate, polyurethane and any of the silicates commonly known as glass. Likewise, inside ply 40 may be chosen from those same transparent materials or others well known to those skilled in the art which are not necessary for impact, ballistic, abrasion, weather resistant or light reflection resistance.

Figure 3:
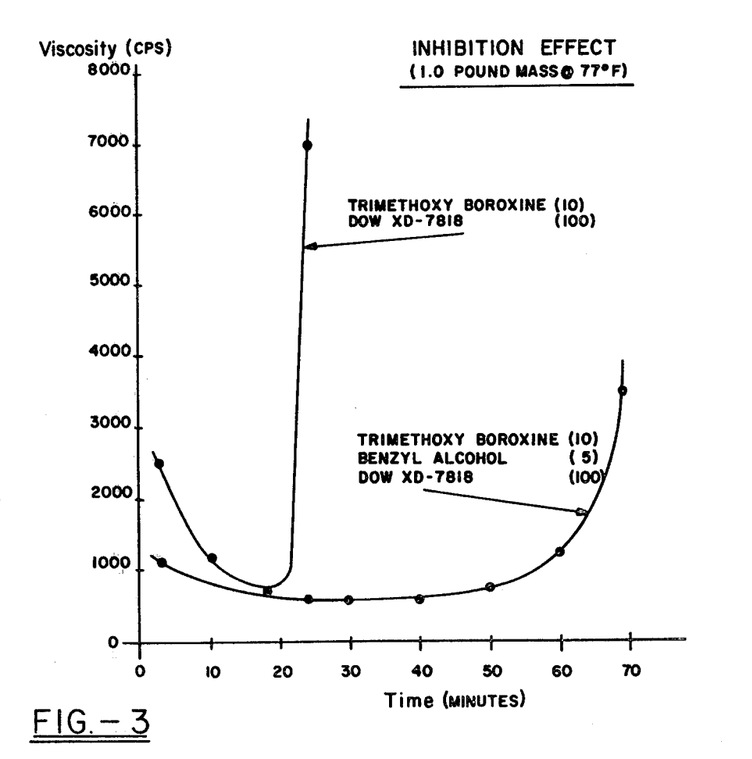
FIG. 3 is a graph of the production of the transparency having benzyl alcohol showing the increase in gel time.

All of the components of interply 20 are mixed and degassed, then cast against an acrylic ply through the use of a casting cell technique well known to individuals in the industry. Should it be necessary to cast interply 20 by itself, the same technique can be used, the only difference being interply 20 would be cast against a chemically treated glass plies, such that after cure the glass plies can be removed, resulting in an optically clear interply 20. This interply casting can then be bound to other transparent layers with materials as discussed below. However, the use of the alcohol permits larger castings then previously possible. Gel times are increased by the addition of the alcohol to permit larger castings, as may be seen in FIG. 3.

When joining the various plies 20, 30, and 40 of the transparency composite 10, it may be necessary to use binding means to insure adequate contiguity between the various layers. For example, binding means 45 may exist between the intense heat resistant resin interply 20 and the inside ply 40, and this binding means 45 may be chosen from adhesives such as silicones, urethanes and epoxies. Also, binding means 35 may be necessary between intense heat resistant resin interply 20 and outside ply 30, the composition of such binding means being typically silicones, urethanes, and epoxies.

However, it is preferred to utilize a mercaptan resin for binding means 35 and 45, as described below, to increase resistant to moisture permeability for transparency composite 10.

The intense heat resistant resin interply 20 may optionally be composed of any epoxy resin cured with adducts of a boroxine such as trimethoxyboroxine, phenyl substituted alkyl alcohols, and organic phosphorus compounds selected from the following group: diphenyl phosphite, trisnonylphenyl phosphite, triphenyl phosphite, diphenylisodecyl phosphite, diphenylisooctyl phosphite and phenyldiisodecyl phosphite. Preferably, diphenyl phosphite and triphenyl phosphite may be used. The addition of from 20 parts to 400 parts of an organic phosphorus compound such as per 100 parts of the boroxine such as trimethoxyboroxine or from about 1 part to about 40 parts per 100 parts of the epoxy resin dramatically increases the intense heat resistant properties of the interply 20 at high temperatures, typically greater than 2000° F. Alternately, the concentration of the organic phosphorus compound may be from about 50 parts to 250 parts per 100 parts of the boroxine or from about 5 parts to about 40 parts per 100 parts of the epoxy resin. The addition of this amount of triphenyl phosphite provides sufficient phosphorus in the resin to increase the time of burn-through of a ¼ inch casting of interply 20 almost ten times as long as interply 20 without phosphorus at these high temperatures. The addition of phosphorus is further beneficial by providing a greater than 20 percent increase in time of burning at the lower temperatures around 2000° F. Therefore, the inclusion of this phosphite significantly increases the intense heat resistant properties already present in the interlayer 20 and complements the other resistant properties in outer layer 30 in the transparency composite 10.

Figure 2:
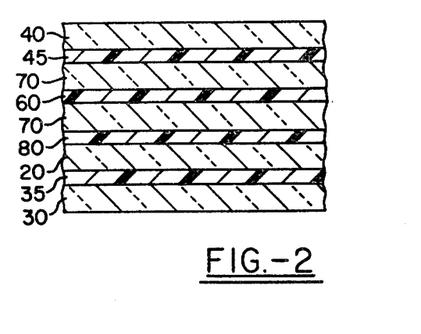
FIG. 2 is a cross sectional view of the clad transparency composite having the intense heat resistant interlayer.

Referring now to FIG. 2, the importance of intense heat resistant epoxy resin interply 20 in a clad composite transparency may be understood. This transparency 50 is shown cross-sectionally to demonstrate the effectiveness of a particular clad composite format. Clad outside ply 30 having binding means 35 is secured to intense heat resistant resin interply 20 comprising an epoxy resin cured with adducts of trimethoxyboroxine and benzyl alcohol alone or together with triphenyl phosphite. A silicone interlayer 80 functions as a flexible adhesive to the opposite surface of interply 20 to a silicate layer 70 typically composed of soda lime glass, borosilicate glass, aluminosilicate glass, silica glass or 96 percent silica glass. On the opposite side of silicate layer 70 is an interlayer 60 which consists of a silicone or polyurethane or polyvinyl butyral interlayer. On the opposite side of interlayer 60 is a second silicate layer 70. On the opposite side of the second silicate is binding means 45 which consists of a silicone or polyurethane interlayer. On the opposite side of the binding means 45 is the inside ply 40 of the composite, composed of the same materials as discussed above, including polycarbonate.

However, it is also possible to utilize a mercaptan resin for any or all of binding means 35 and 45 and interlayers 60 and 80. The importance of such mercaptan resin in moisture permeability resistance for composite 50 is described below.

It has been found that the combination of these layers 20, 30, 35, 40, 45, 60, 70, and 80 in the order described above provides a synergistic resistance greater than the application of layers 30 and 40 surrounding interlayer 20. Clad outer layer 30 may be selected from those transparent materials commonly known to those skilled in the art, as described above and may typically be acrylic.

Figure 5:
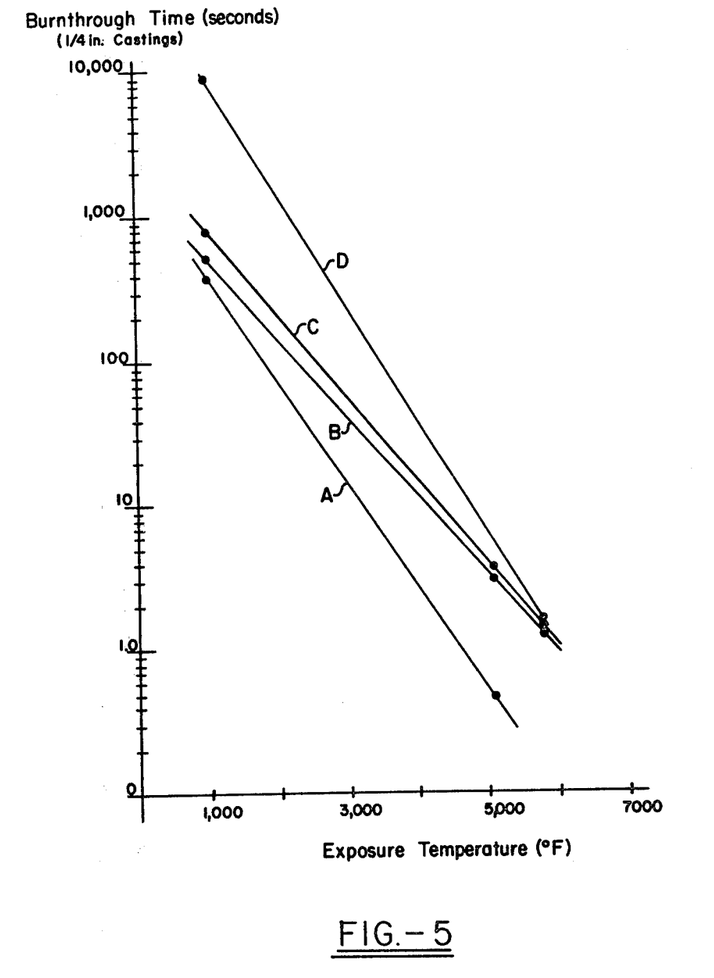
FIG. 5 is a graph showing the increased burnthrough resistance on the transparencies having benzyl alcohol and triphenyl phosphite.

For an understanding of the improved heat resistant properties of interply 20, reference is had to FIG. 5.

TABLE 2

HEAT RESISTANT TRANSPARENCIES - RELATIONSHIP BETWEEN BURNTHROUGH TIME AND EXPOSURE TEMPERATURE

|  | Line A | B | C | D |
|---|---|---|---|---|
| Trimethoxy Boroxine | 7.5 | 10 | 10 | 7.5 |
| Benzyl Alcohol | — | 5 | 3 | 2.5 |
| Triphenyl Phosphite | — | 5 | 10 | — |
| DER-332 | 100 | — | — | — |
| DEN-431 | — | 85 | 90 | 90 |
| Heloxy-68 | — | 15 | — | — |
| Silane A-187 | — | 1 | 1 | 1 |
| Diphenyl Phosphite | — | — | — | 15 |
| Burnthrough at 2000° F. (secs.) | 378 | 522 | 790 | 9000 |
| Burnthrough at 6000° F. (secs.) | 0.4 | 3.0 | 3.7 | 5.8 |

It can be seen from FIG. 5 that by the addition of benzyl alcohol, a higher concentration of trimethoxyboroxine can be incorporated, resulting in improved, burnthrough resistance at 2000° F. and at 6000° F.

Transparencies 10 and 50 which contain interply 10 may be utilized in various military and industrial applications. Typically, these applications may include the use of transparencies in military hardware and aircraft, as well as spacecraft. Further, industrial applications include transparencies where protection against the thermal effects of fossil fuel fires, thermal nuclear blasts and high energy radiation are required.

The lasting success of any transparency composite, designed to withstand high heat resistance, impact resistance, ballistic resistance, abrasion resistance, remains dependent upon its continuing transparent nature. The plurality of layers of composites 10 and 50 and the chemical composition of each layer are differentially susceptible to the permeation of moisture into and through the layers. The retention of moisture between and within the various layers of this invention and any conventional transparency composite having multiple layers creates a haze which disrupts clarity of light transmissions through the transparency composite.

A barrier to the generation of haze is necessary for any multi-layer transparency composite. The layers 35 and 45 and interlayers 60 and 80 have been found to provide the most effective permeation barrier, resistant to moisture permeability into central layers, such as heat resistant interlayer 20 and silicate layers 70 as seen in FIG. 1 and FIG. 2.

The composition for the binding means 35 and 45 and interlayers 60 and 80 comprises about 100 parts by weight of a mercaptan terminated resin, from about 40 to about 250 parts by weight of an epoxy resin and desirably from about 100 to about 200 parts by weight, and from about 0.5 to about 4.0 parts by weight of a silane catalyst.

The mercaptan terminated resin is an aliphatic hydrocarbon based compound having a thio reactive group terminating each end of the molecule. The mercaptan has the following general formula:

where R is an aliphatic hydrocarbon having from 1 to 18 carbon atoms and n is 1 or 2. The mercaptan resin is a material commercially available from Diamond Shamrock Corporation and sold identified as DION-3-800LC.

The epoxy rsin of the binding means 35 or 45 or interlayer 60 or 80 is composed of epoxy resins previously disclosed with reference to interply 20. Typical epoxy resins include, but are not limited to, bisphenol-A type, bisphenol-F type, and novolac type epoxy resins. A preferred concentration of the epoxy resin depends on the type of epoxy resin used. For an epoxy-novolac type resin the preferred concentration is about 175 parts by weight. For a bisphenol-F type the preferred concentration is about 100 parts by weight. Epoxy resins commercially available include DER-332, a product of Dow Chemical Company.

The silane catalyst of the binding means 35 or 45 or interlayer 60 or 80 is composed of an amine terminated silane compound such as N-aminoalkyl-aminoalkyl-trialkoxysilanes of the formula wherein $R_1$ is an alkylene having 1–6 carbon atoms and $R_2$ is an alkyl, having 1–6 carbon atoms, and aminoalkyl-trialkoxysilanes of the formula wherein $R_1$ and $R_2$ are as defined above.

Examples of preferred silanes are gamma aminopropyl triethoxy silane and normal beta aminopropyl gamma aminopropyl trimethoxy silane. The preferred concentration of the amino-silane catalyst is about 2.5 parts by weight. The amino-silane is commercially available from Union Carbide in their A-1110 and A-1120 formulations.

Figure 11:
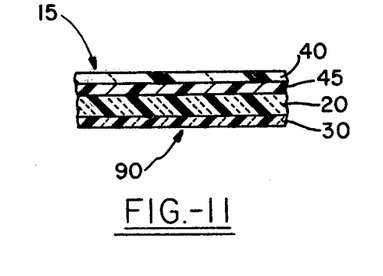
FIG. 11 is a cross sectional view of a transparency composite having no interlayer binding means between the intense heat resistant interlayer and the outside ply.

As expressed above, the binding means 35 or 45 and interlayer 60 or 80 have traditionally employed conventional silicones, urethanes, and epoxies. However, use of the mercaptan interlayer for these purposes provides unexpected improvement to resistance to moisture permeation. The following table compares the test samples having various composite constructions, including a construction having outer ply 30, heat resistant interlayer 20, binding means 45 and inner ply 40, such as that seen in FIG. 11, and a construction having no binding means 35 or 45.

TABLE 3

| Composite Number | Composite Component | Thickness (in.) |
|---|---|---|
| 1 | polycarbonate (30) | 0.256 |
|  | silicone resin (35) | 0.1 |
|  | Heat resistant interlayer (20) | 0.236 |
|  | silicone resin (45) | 0.1 |
|  | polycarbonate (40) | 0.256 |
| 2 | polycarbonate (30) | 0.256 |
|  | mercaptan interlayer (35) | 0.1 |
|  | heat resistant interlayer (20) | 0.236 |
|  | mercaptan interlayer (45) | 0.1 |
|  | polycarbonate (40) | 0.256 |
| 3 | as-cast acrylic (30) | 0.125 |
|  | heat resistant interlayer (20) | 0.236 |
|  | as-cast acrylic (40) | 0.125 |
| 4 | as-cast acrylic (30) | 0.125 |
|  | heat resistant interlayer | 0.236 |
|  | silicone resin (45) | 0.1 |
|  | polycarbonate (40) | 0.256 |
| 5 | as-cast acrylic (30) | 0.125 |
|  | heat resistant interlayer (20) | 0.236 |
|  | mercaptan layer (45) | 0.1 |
|  | polycarbonate (40) | 0.256 |
| 6 | stretched acrylic (30) | 0.1 |
|  | heat resistant interlayer (20) | 0.125 |
|  | stretched acrylic (40) | 0.1 |
| 7 | urethane (30) | 0.1 |
|  | heat resistant interlayer (20) | 0.236 |
|  | urethane (40) | 0.1 |
| 8 | urethane (30) | 0.1 |
|  | silicone resin (35) | 0.1 |
|  | heat resistant interlayer (20) | 0.235 |
|  | silicone resin (45) | 0.1 |
|  | urethane (40) | 0.1 |
| 9 | urethane (30) | 0.1 |
|  | mercaptan interlayer (35) | 0.1 |
|  | heat resistant interlayer (20) | 0.236 |
|  | mercaptan interlayer (45) | 0.1 |
|  | urethane (40) | 0.1 |
| 10 | as-cast acrylic (30) | 0.08 |
|  | heat resistant interlayer (20) | 0.236 |
|  | as-cast acrylic (40) | 0.08 |
| 11 | as-cast acrylic (30) | 0.1 |
|  | silicone resin (35) | 0.1 |
|  | heat resistant interlayer (20) | 0.236 |
|  | silicone resin (45) | 0.1 |
|  | as-cast acrylic (40) | 0.1 |
| 12 | as-cast acrylic (30) | 0.08 |
|  | mercaptan interlayer (35) | 0.1 |
|  | heat resistant interlayer (20) | 0.236 |
|  | mercaptan interlayer (45) | 0.1 |
|  | as-cast acrylic (40) | 0.08 |

The composites of TABLE 3 were tested under extreme temperature and humidity conditions. The direct comparison of the performance of the mercaptan resin of the present invention and the performance of the conventional silicone resin, or no binding means at all, may be seen in the graphs of FIGS. 6–9.

Figure 6:
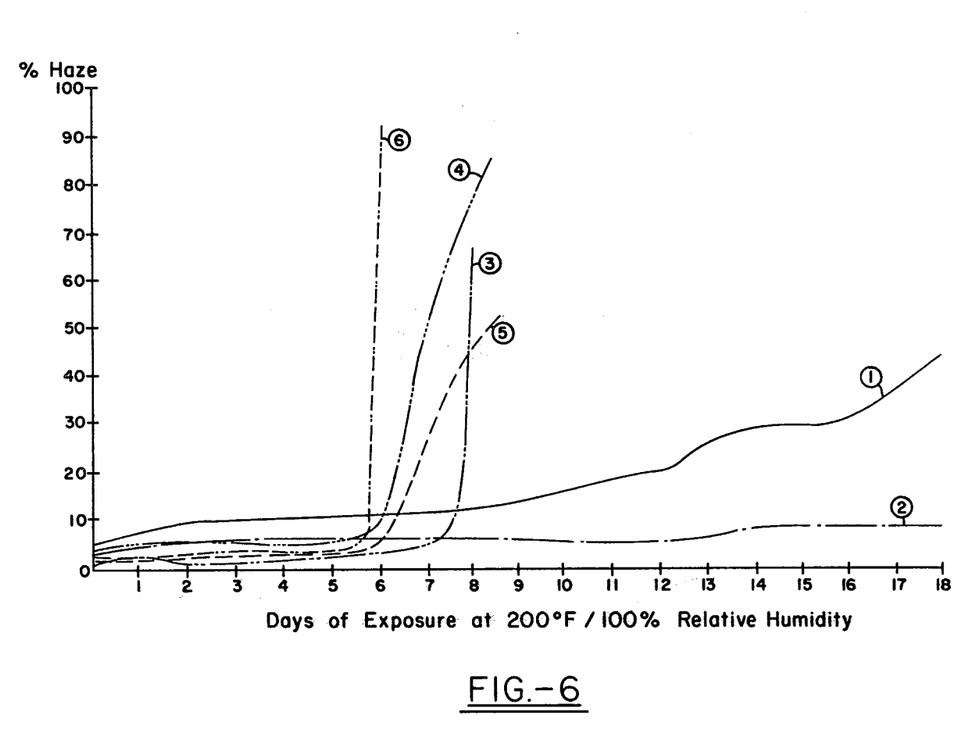
FIG. 6 is a graph showing the increased resistance to moisture permeability of mercaptan resin binding means bonded to various transparency layers when exposed to temperatures of about 200° F. and 100 percent relative humidity.

In FIG. 6, the percent of haze occurring in the composite is compared with days of constant exposure of the composite at 200° F. and 100 percent relative humidity. All other parameters constant, a direct comparison of composite No. 1 with conventional silicone resin and composite No. 2 with the mercaptan interlayer of the present invention demonstrates the increased resistance to moisture permeation in the latter composite. Likewise, a direct comparison of composites No. 4 and No. 5 show the increased resistance to moisture permeation in the latter composite. Composites No. 2 and No. 5 are clearly superior to their counterparts No. 1 and No. 4, as well as No. 3 and No. 6 which do not provide any binding means moisture permeation protection.

Figure 7:
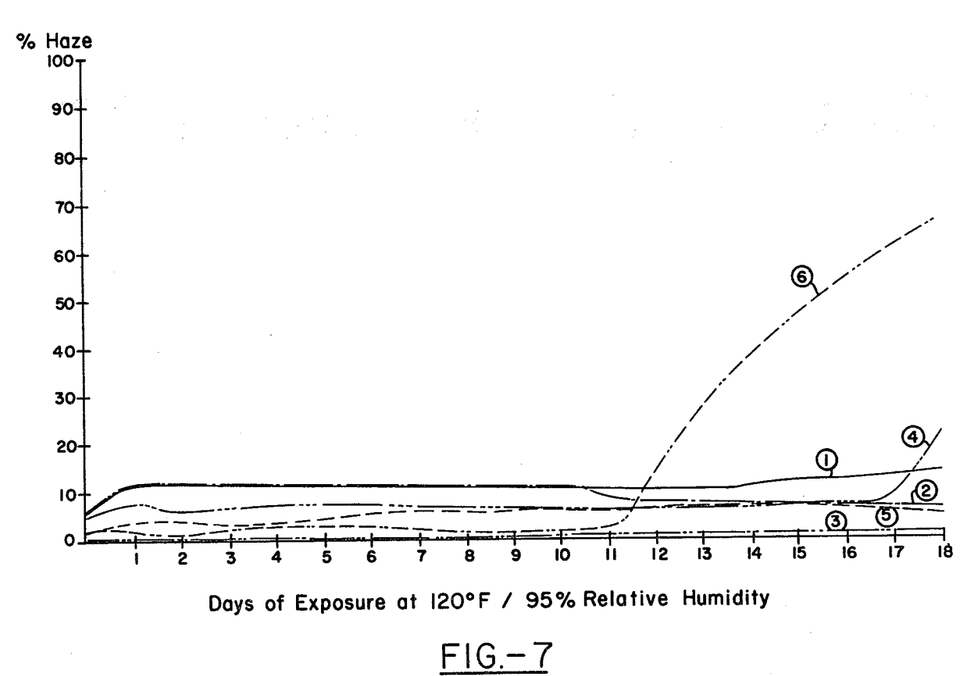
FIG. 7 is a graph showing the increased resistance to moisture permeability of mercaptan resin binding means bonded to various transparency layers when exposed to temperatures of about 120° F. and 95 percent relative humidity.

In FIG. 7, a graph showing the effect of constant exposure to 120° F. and 95 percent relative humidity to the same six composites is seen. While not as pronounced as that seen in FIG. 6, the comparison of composites No. 1 and No. 2 and of composites No. 4 and No. 5 clearly indicates the superiority of the mercaptan interlayer binding means over the silicone resin binding means.

Figure 8:
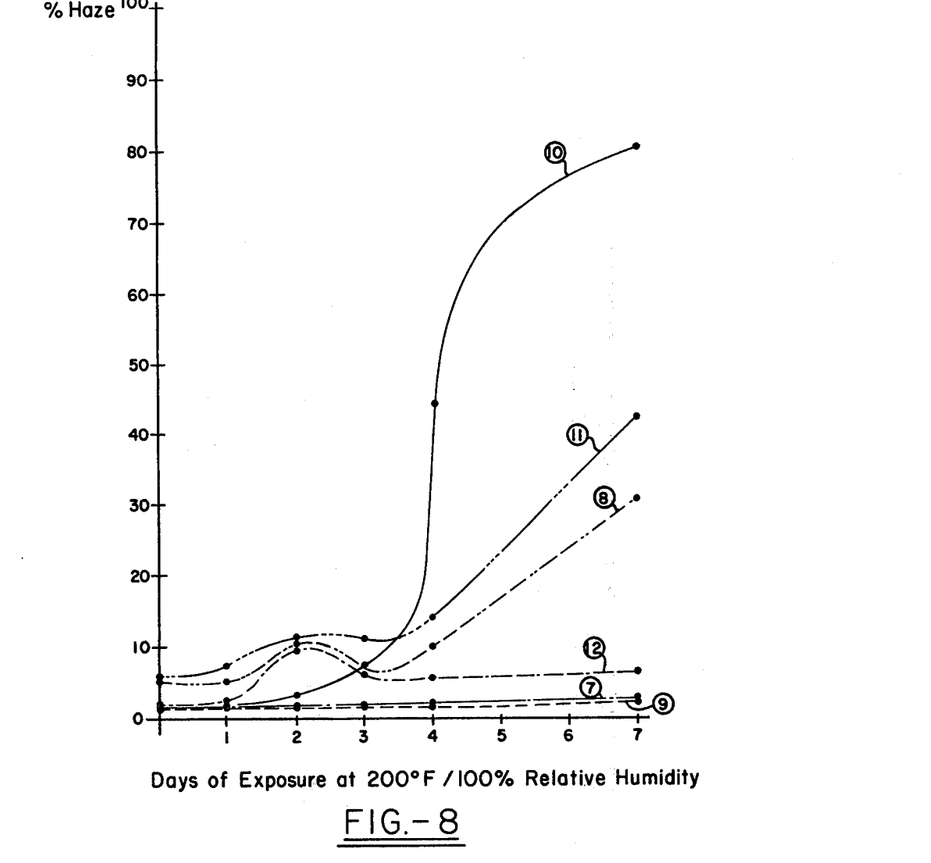
FIG. 8 is a graph showing the increased resistance to moisture permeability of mercaptan resin binding means bonded to other various transparency layers when exposed to temperatures of about 200° F. and 100 percent relative humidity.

In FIG. 8, the graph showing the test of exposure at 200° F. and 100 percent relative humidity for the remaining six composites is seen. A direct comparison of composites No. 8 and No. 9, where the only difference is the substitution of mercaptan interlayer for silicone resin, demonstrates the clear superiority of the mercaptan resin in resistance to haze as caused by moisture permeation. Further, a comparison of composites No. 11 and No. 12, substituting mercaptan interlayer for silicone resin, demonstrates the superiority of the mercaptan interlayer of the present invention over conventional binding means.

Figure 9:
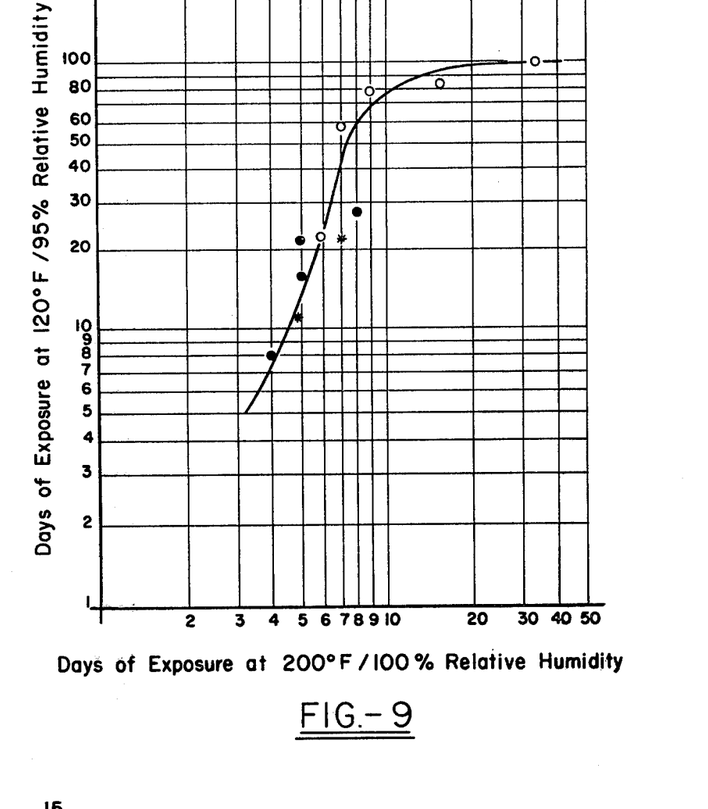
FIG. 9 is a graph showing the composite evaluation of various interlayer binding means and the effectiveness of resistant to moisture permeability.

FIG. 9 summarizes the superiority of the mercaptan interlayer of the present invention over conventional or no resin by comparing performance at 200° F./100% relative humidity with performance at 120° F./95% relative humidity. At identical acceptable percentage haze levels, the mercaptan interlayer could last as long as 100 days at 120° F./95% relative humidity and 35 days at 200° F./100% relative humidity. By comparison, the silicone resin could only withstand about 22 days at 120° F./95% relative humidity and 8 days at 200° F./100% relative humidity.

FIGS. 6–8 also demonstrate that the mercaptan interlayer of the present invention is effective for conventional outer and inner plies 30 and 40: acrylic, polycarbonate, urethane, and any combinations of them. Moreover, the mercaptan interlayer is available to replace the conventional silicone, epoxy, or urethane resins for any transparency composite using any conventional transparency including silicates commonly known as glass. Indeed, the mercaptan interlayer of the present invention is an effective interlayer 60 and 80 for clad composite transparency 50 as seen in FIG. 2.

Table 4 below demonstrates a comparison of the specific permeability values for various formulations of the mercaptan interlayer and conventional silicone and other resins. The specific permeability of a film to moisture is defined as the milligrams of water that permeate one square centimeter of film of 1 millimeter thickness each 24 hours after a constant rate has been attained under the preferred conditions of 25° C. and using 100% relative humidity inside the cup and a phosphorus pentoxide desiccated atmosphere outside the cup. The formula of calculation is $$SP = \frac{W(T(25.4 \text{ mm/in}))}{A}$$

where SP is specific permeability, W is weight loss in milligrams in a 24 hour period, T is the film thickness in inches, and A is exposed cup surface area.

TABLE 4

| Type of Resin | Film Thickness | Specific Permeability[4] (ASTM D-1632-62) |
|---|---|---|
| mercaptan interlayer[1] | 0.098 | 0.4978 |
| mercaptan interlayer[2] | 0.124 | 0.0627 |
| mercaptan interlayer[3] | 0.114 | 0.4633 |
| low-strength silicone | 0.100 | 4.8539 |
| low-strength RTV silicone | 0.104 | 4.2270 |
| high-strength silicone | 0.100 | 4.8768 |
| high-strength RTV silicone | 0.118 | 5.4549 |
| pigmented RTV silicone | 0.101 | 4.0020 |

[1] Mercaptan interlayer comprising 100 parts by weight of mercaptan resin, 100 parts by weight of epoxy resin, and 2 parts by weight of silane catalyst.
[2] Mercaptan interlayer comprising 100 parts by weight of mercaptan resin, 50 parts by weight of epoxy resin, and 1.5 parts by weight of amino-silane catalyst.
[3] Mercaptan interlayer comprising 100 parts by weight of mercaptan resin, 100 parts by weight of epoxy resin, and 1 part by weight of amino-silane catalyst.
[4] Units in mg. · mm/24 hr. cm$^2$.

Because the ideal specific permeability is near zero, it is readily seen that a mercaptan interlayer of the present invention is approximately 10 times better than conventional resins. This direct comparison demonstrates the vast superiority of a mercaptan interlayer of the present invention over those binding agests presently employed.

Two other properties significant for the interlayer of the present invention are ultimate strength and modulus. During high temperature, high humidity condition, the interlayer must maintain proper adhesion to prevent delamination of the interlayer and the other various layers in the composite. Further, the interlayer must have an acceptable rate of change of modulus during the high temperature, high humidity conditions, to prevent alteration of the interlayer effectiveness sandwiched between other layers during the course of use. For a comparison of modulus and ultimate strength properties of the interlayers of the present invention with interlayers common to those skilled in the art, reference is had to Tables 5 and 6. Table 5 describes the formulation of the testing material and Table 6 demonstrates the effect of high temperature and high humidity on the modulus and ultimate strength properties of the formulations.

TABLE 5

FORMULATION OF INTERLAYER FOR COMPOSITE OF GLASS - INTERLAYER - POLY CARBONATE

| Formulation | Mercaptan Resin | Epoxy Resin | Amino-Silane | High Strength Silicone | Fumed Silica Compound 1[*1] |
|---|---|---|---|---|---|
| 1 | 100 | 100 | 2 | — | — |
| 2 | 100 | 150 | 2 | — | — |
| 3 | 100 | 175 | 2 | — | — |
| 4 | 100 | 200 | 3 | — | — |
| 5 | — | — | — | 100 | 5 |
| 6 | — | — | — | 100 | — |

[*1] A thixotropic agent available commercially as CAB-O-SIL EH-5.

TABLE 6

| | | Torsional - Shear Modulus/Ultimate Strength (PSI) | | | | | |
|---|---|---|---|---|---|---|---|
| | | Formulation | | | | | |
| | | 1 | 2 | 3 | 4 | 5 | 6 |
| Days of Exposure at 120° F./95% Relative Humidity | 1 | 210/771 | 78/148 | 25/62 | 28/60 | 25/43* | 16/53 |
| | 2 | 207/450 | — | 22 | 22 | 6/8** | — |
| | 3 | — | — | — | — | — | 22/72 |
| | 4 | — | — | — | — | — | 7/19** |
| | 6 | 190/291 | 49/110 | — | 33/67 | 6/10 | — |
| | 7 | — | — | 33/65 | — | — | — |
| | 14 | 166/266 | 73/122 | — | 98/153 | 9/14 | — |
| | 15 | — | — | 55/101 | — | — | — |
| | 27 | 85/200 | — | — | 105/289 | — | — |

*Haze Appeared
**Delamination Started

As may be seen from an examination of Table 6, a variation in the formulation of the inner layer of the present invention may control the modulus and its rate of change during the days of exposure to high-temperature/high-humidity conditions. Over the course of the period examined, the ultimate strength and its rate of change could be controlled by the type of formulation of the interlayer. Generally, with increasing epoxy resin concentration, the modulus and ultimate strength comparisons during the days of the exposure increased when the epoxy was greater than 150 parts per 100 parts of mercaptan resin.

Table 6 also demonstrates the clear superiority of the interlayer formulations of the present invention over those interlayer compositions known to those skilled in the art. On the first day, formulation No. 5 exhibited haze, and by the fourth day, both silicone formulations started to delaminate from the composite of glass-interlayer-polycarbonate. In comparison to this, the formulations 1 and 4 lasted as long as 27 days when the experiment was concluded to report these results. Furthermore, the interlayer formulations of the present invention have a variety of modulus and ultimate strength properties to meet various commercial applications depending upon the materials between which the interlayer is sandwiched.

Figure 13:
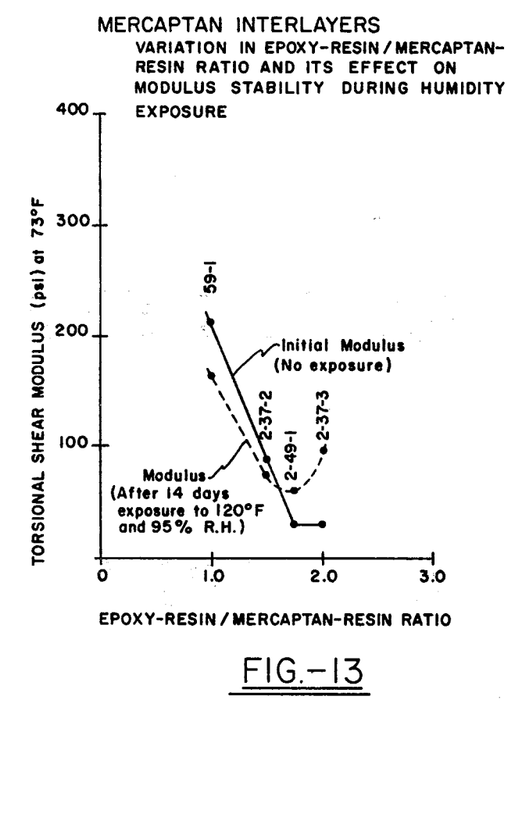
FIG. 13 is a graph showing the variation in concentrations of the comosition of the present invention and its effect on modulus stability during humidity exposure.
Figure 14:
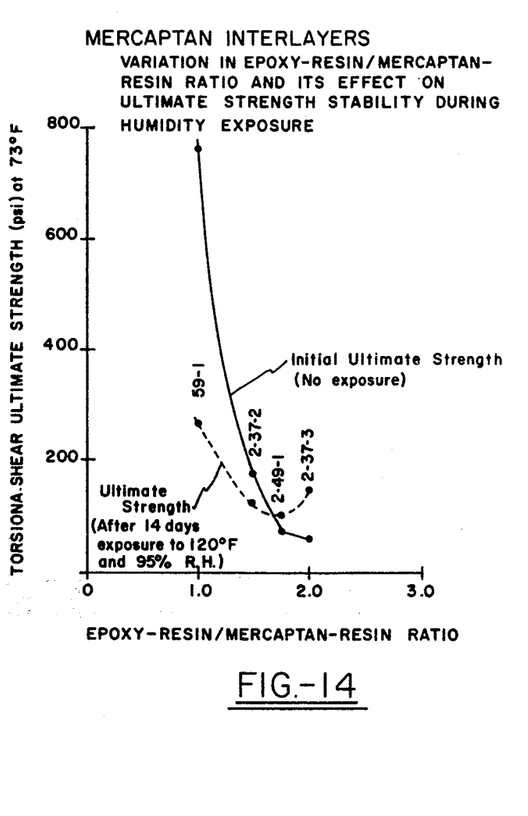
FIG. 14 is a graph showing the variation in concentrations of the composition of the present invention and its effect on ultimate strength stability during humidity exposure.

From an examination of FIGS. 13 and 14, it is possible to optimize the formulation for modulus stability and ultimate strength stability. FIG. 13 demonstrates in graphic form the information shown in Table 6 for a comparison of initial modulus with the modulus after 14 days of exposure. A ratio of epoxy resin/mercaptan resin exhibits stability over the 14 days in the range of 1.5 to 1.8. Likewise, this ratio is confirmed for ultimate strength comparisons as seen in FIG. 14.

Figure 10:
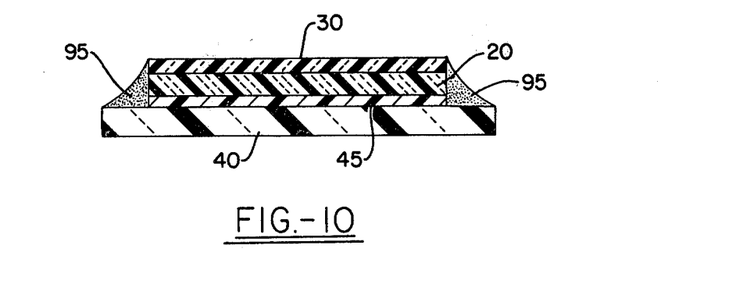
FIG. 10 is a cross sectional view of a transparency composite at an edge as sealed by edge sealant material of the present invention.

The mercaptan composition of the present invention is effective, not only to resist moisture permeation between plies of transparent composite construction. As seen in FIG. 10, edge sealant 95 may seal edges of outer ply 30, heat resistant interlayer 20, binding means 45

(either of the invented composition or a conventional composition) and the upper surface of inner layer 40. The composite shown in FIG. 10 is the same as the composite 90 shown in FIG. 11, typical of transparent composites used in high elevation aircraft. Edge sealer 95 is likewise useful to seal edges of composites 20 and 50 shown in FIG. 2 or any conventional transparent composite, either with inner ply 40 extending beyond the other transparency components or cut at the same place as the other transparency components.

Figure 12:
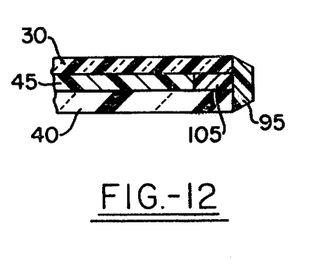
FIG. 12 is an illustrative view of a transparency composite having a slot to be filled and an edge sealant material.

The mercaptan composition may also fill in the slot created during the manufacture of the transparency on the outside edge of any transparency composite. As seen in FIG. 12, this slot filler 105 combines the functions of the edge sealant 95 and the interlayer 45. Neither the slot filler 105 nor the edge sealant need be transparent and may be translucent or opaque with the addition of thixotropic agents, such as fumed silica compounds, or fillers. Indeed, slot filler 105 and edge sealer 95 may merge into a perimeter sealant.

The edge sealer 95 and the slot filler 105 demonstrates significant improvements over the use of high-strength silicones known to those skilled in the art. An examination of Table 7 demonstrates the moisture impermeability of the mercaptan compositions over that of the high-strength silicone.

composition, Panel 3 demonstrated some improvement over that seen for Panel 2. In this case, after the edge sealer and slot filler were cut off and removed with manual difficulty, the silicone interlayer could be delaminated from only the glass layer. While Panels 2 and 3 represent improvement over the conventional performance of Panel 1, Panels 4 and 5 provide even greater improvement.

By using the mercaptan compositions for both slot filler 105 and edge sealer 95, the interlayer was significantly protected from moisture permeation. For the interlayers of Panels 4 and 5, the combination of the edge sealer and slot filler provided the protection to maintain a bond between the silicone interlayer and both the glass and polycarbonate. Indeed, using this second mercaptan composition, slot filler 105 had to be dug from the periphery of the Panel No. 5.

The mercaptan compositions of the present invention not only serve as an interlayer, but also may serve as an edge sealer or slot filler. The variety of combinations of transparent composites which may employ the composition of the present invention in these various functions is within the scope of this invention.

While in accordance with the Patent Statutes, one best mode and preferred embodiment of the invention has been provided, the invention is not to be limited

TABLE 7

EXAMINATION OF GLASS-SILICONE-POLYCARBONATE COMPOSITES WITH EDGE SEALERS AND SLOT FILLERS EXPOSED 29 DAYS AT 120° F./95% R.H.

|  | PANEL NO. 1 | PANEL NO. 2 | PANEL NO. 3 | PANEL NO. 4 | PANEL NO. 5 |
|---|---|---|---|---|---|
| SLOT-FILLER (105) | HIGH-STRENGTH SILICONE PLUS 5% BY WT. CAB-O-SIL EH-5 (Fumed Silica Compound) | | | MERCAPTAN* COMPOSITION PLUS 5% BY WT. CAB-O-SIL EH-5 (Fumed Silica Compound) | MERCAPTAN** COMPOSITION PLUS 5% BY WT. CAB-O-SIL EH-5 (Fumed Silica Compound) |
| EDGE-SEALER (95) | NONE | MERCAPTAN COMPOSITION* PLUS 5% BY WT. CAB-O-SIL EH-5 (Fumed Silica Compound) | MERCAPTAN COMPOSITION** PLUS 5% BY WT. CAB-O-SIL EH-5 (Fumed Silica Compound) | MERCAPTAN COMPOSITION* PLUS 5% BY WT. CAB-O-SIL EH-5 (Fumed Silica Compound) | MERCAPTAN COMPOSITION** PLUS 5% BY WT. CAB-O-SIL EH-5 (Fumed Silica Compound) |
| INTERLAYER (HIGH-STRENGTH SILICONE) (45) | Slot-Filler can be removed Silicone interlayer can be readily delaminated from glass and polycarbonate | Edge sealer cut off Slot-Filler could be removed with manual difficulty Silicone interlayer could be delaminated from both. The adhesion was much better than Panel No. 1 | Edge sealer cut off Slot-Filler could be removed with difficulty Silicone interlayer could be delaminated from glass only - was better than Panel No. 1 | Edge sealer cut off Slot-Filler could be removed with difficulty Silicone interlayer appeared to be well bonded | Edge sealer cut off Slot-Filler had to be dug out Silicone interlayer appeared to be well bonded - minor spot delaminations |

| *Mercaptan Resin | 100 | **Mercaptan Resin | 100 |
|---|---|---|---|
| Epoxy Resin | 100 | Epoxy Resin | 200 |
| Amino-Silane | 2 | Amino-Silane | 2 |

Each panel was subjected to 29 days of exposure at 120° F. and 95% relative humidity. Panel No. 1 only had a high-strength silicone slot filler and once that was removed, it was apparent that the silicone interlayer could be readily delaminated from both the glass and the polycarbonate layers. In contrast to this the mere addition of an edge sealer having one mercaptan composition plus the thixatropic agent increase the performance of the composite during the 29 days of expoosure. After the edge sealer 95 was cut off, the slot filler 105 could only be removed with manual difficulty. However, the silicone interlayer could be delaminated from both the glass and polycarbonate, although the adhesion was better than that found in Panel 1. By increasing the epoxy resin concentration of the mercaptan thereto or thereby. Therefore, for an understanding of the scope of the invention, reference is had to the following claims.

What is claimed is:

1. A composition resistant to moisture permeation comprising:
    a blend having,
       (a) about 100 parts by weight of a mercaptan compound having the following formula:

where R is an aliphatic hydrocarbon group having from 1 to 18 carbon atoms and where n is 1 or 2;

(b) from about 40 to about 250 parts by weight of an epoxy resin; and (c) from about 0.5 parts by weight to about 4.0 parts by weight of a silane selected from the group consisting of:

N-aminoalkyl-aminoalkyl-trialkoxysilanes of the formula:

wherein $R_1$ is an alkylene having 1-6 carbon atoms and $R_2$ is an alkyl, having 1-6 carbon atoms; and aminoalkyl-trialkoxysilanes of the formula:

wherein $R_1$ and $R_2$ are as defined above, and combinations thereof.

2. A composition according to claim 1 wherein said epoxy resin comprises from about 100 parts by weight to about 200 parts by weight.

3. A composition resistant to moisture permeation, comprising;

a blend having a specific permeability of less than 1.00 mg:mm/24 hr cm$^2$;

said blend comprising from about 100 parts by weight of a thio terminated polyether, from about 40 to about 250 parts by weight of an epoxy resin; and from about 0.5 parts by weight to about 4.0 parts by weight of a silane terminated compound.

4. A composition according to claim 2, wherein said silane is selected from the group consisting of gamma aminopropyl triethoxy silane, normal beta aminoethyl gamma aminopropyl trimethoxy silane, and combinations thereof.

5. A composition according to claim 4, wherein the amount of said silane is about 2.5 parts by weight.

6. A composition according to claim 3, wherein said epoxy resin ranges from about 100 to about 200 parts by weight.

7. A composition according to claim 6, wherein said mercaptan compound has the formula where
R is an aliphatic hydrocarbon group having from 1 to 18 carbon atoms and where n is 1 or 2; and
wherein said silane is selected from the group consisting of: N-aminoalkyl-aminoalkyl-trialkoxysilanes of the formula:

wherein $R_1$ is an alkylene having 1-6 carbon atoms and $R_2$ is an alkyl having 1-6 carbon atoms, and aminoalkyl-trialkoxysilanes of the formula:

wherein $R_1$ and $R_2$ are as defined above, and combinations thereof.

8. A composition according to claim 7, wherein said silane is selected from the group consisting of gamma aminopropyl triethoxy silane, normal beta aminoethyl gamma aminopropyl trimethoxy silane, and combinations thereof.

* * * * *

UNITED STATES PATENT OFFICE
CERTIFICATE OF CORRECTION

Patent No. 4,412,052         Dated October 25, 1983

Inventor(s) John R. Uram, Jr.

It is certified that error appears in the above-identified patent and that said Letters Patent are hereby corrected as shown below:

Column 8, line 24, correct "rsin" to --resin--.

Column 9, Table 3, at line 36, "0.235" should read --0.236--.

Column 11, line 41, "agests" should be --agents--.

Signed and Sealed this

Sixth Day of March 1984

[SEAL]

*Attest:*

*Attesting Officer*      GERALD J. MOSSINGHOFF
                         *Commissioner of Patents and Trademarks*